G. L. HAUSSKNECHT.
Running-Gear.
No. 8,648. Patented Jan. 13, 1852
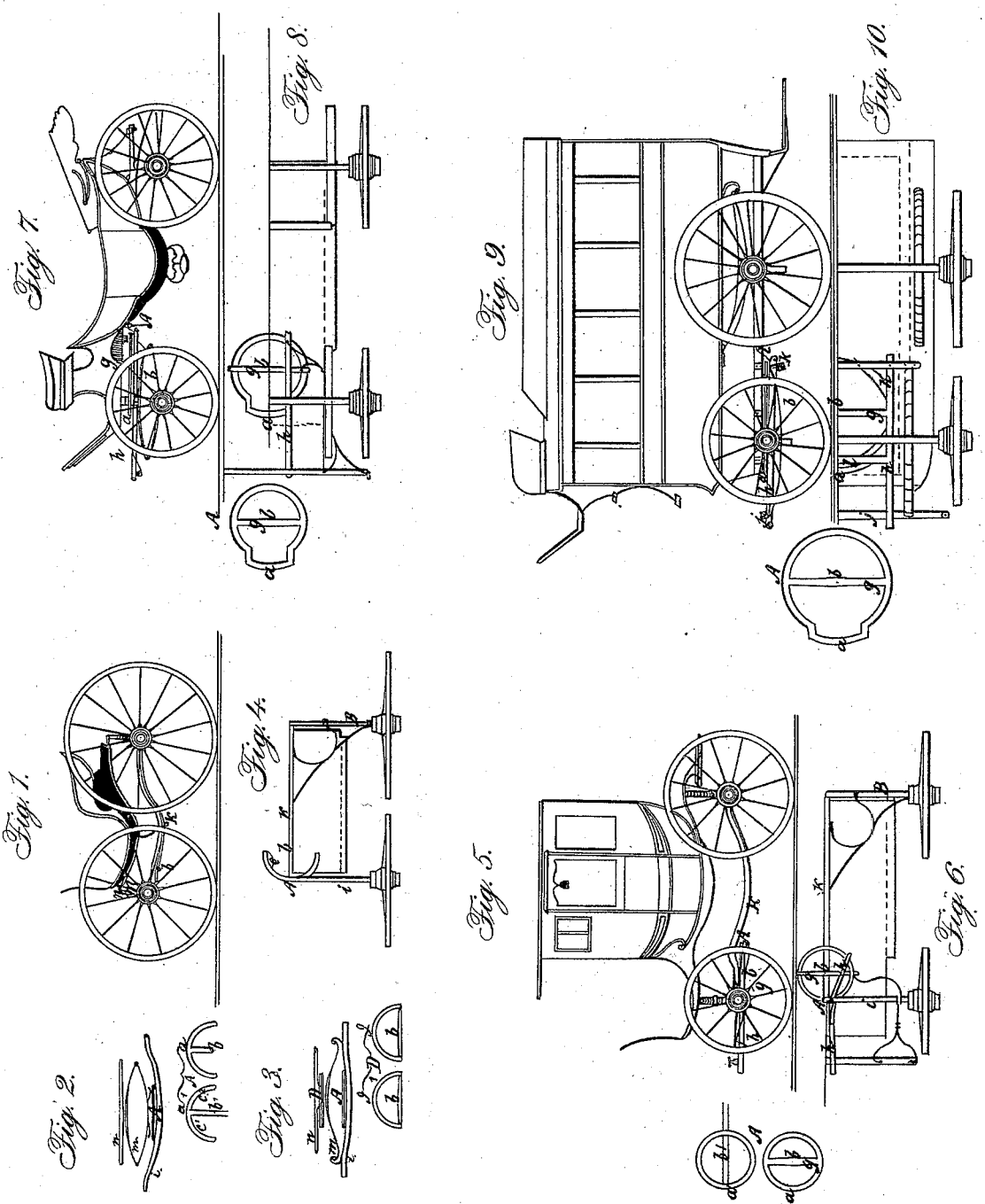

UNITED STATES PATENT OFFICE.

GUSTAVUS L. HAUSSKNECHT, OF NEW HAVEN, CONNECTICUT.

RUNNING-GEAR OF CARRIAGES.

Specification forming part of Letters Patent No. 8,648, dated January 13, 1852; Reissued March 17, 1857, No. 437.

*To all whom it may concern:*

Be it known that I, GUSTAVUS HAUSSKNECHT, of the city and county of New Haven and State of Connecticut, have invented a new and useful Improvement in the Mode of Constructing the Running Parts of Carriages and All Four-Wheeled Vehicles; and I do hereby declare the following to be a full and exact description.

Formerly to enable the carriage to turn in a short curve the fore wheels were constructed of sufficiently small diameter to run under the body of the vehicle; but the advantage of constructing them of large diameter in diminishing the draft is so great that the inconvenience of turning is disregarded, and large wheels are now in almost universal use.

My improvement consists in so constructing the running parts of carriages and all four wheeled vehicles that the wheels may be of the largest diameter desired and at the same time the carriage can be turned around and about within the smallest possible space and without the wheels running under the body of the vehicle.

The principle of my invention consists in placing the turning point of the vehicle back of the forward axle tree.

Different modes of construction and adjusting the turning are required to adapt my improvement to different kinds of vehicles commonly in use. And I proceed to describe the modes which may be used in adapting my improvement to such vehicle.

First. To vehicles with elliptic springs as shown in Figures 1 and 2 of the annexed drawings. In these vehicles I dispense with the fifth wheel and use in lieu thereof two semicircular plates of the form shown in Fig. 2, the semidiameters of which are equal to the distance from the fore axle tree to which it is required to carry back the turning point. (This distance in these and all kinds of carriages may be varied at pleasure but I have found from six to nine inches to be the most suitable, though the turning points may be carried much farther back especially in vehicles with a straight perch.) One of the plates above mentioned is fastened at the center of its circumference ($a$) to the fore axle tree, and the other plate at the center of its circumference ($a$) to the head block. The king bolt which is welded into the perch plate passes through at ($b$) fastening the plates together and constituting the turning point of the vehicles. Two hooks ($c$) fastened to the upper plate and projecting over the under plate prevent them from separating.

Second. To vehicles with half springs, or where the spring is fastened to the axle tree and moves with it. In these vehicles I adapt the same mode of applying my improvement as has been above described; but inasmuch as the spring moves with the axle, an additional contrivance is required, as shown in Fig. 3 of the annexed drawings. This consists of two semicircular plates as there shown, the under one having a slot ($e$) of sufficient width to admit of the bolts ($f$) to pass freely through and along it. The upper plate is stationary and is fastened at the center of its circumference ($d$) to the spring bar. The lower plate is fastened at the center of the circumference ($d$) to the spring, and they are fastened together by the two bolts ($f$). There is also shown in Fig. 3 a front view of the mode above described, applying my improvement to vehicles of this description. Fig. 4 is an under view of my improvement as applied to the two kinds of carriages above described. These modes will answer for all vehicles with shafts or jointed poles.

Third. Figs. 5 and 6 show a carriage with a stiff pole and with a perch. These require full fifth wheels, as shown at A. The two futchils one of which is shown ($h$) are to extend back sufficiently far to fasten to them the under plate of the fifth wheel, one additional bar or block ($g$), is required, extending across the futchils and passing through the center of the fifth wheel at ($b$). The upper plate is fastened to the perch and the head block. The king bolt is welded to the perch plate and passes through the center of the fifth wheel and the additional bar or block above described, at ($b$), constituting the turning point of the vehicles. Fig. 6 is the under view of the mode above described of applying my improvement to carriages of this description.

Fourth. Figs. 7 and 8 show a coach or carriage without a perch, also requiring a full fifth wheel (A). The mode of applying my improvement to this kind of carriage is the same as next above described, except that as this carriage has no perch two additional bars or block ($g$) instead of one, are required. The under one crosses the futchils and is fastened to them, the upper is fastened to the body both passing through the center of the fifth wheel. The king bolt passes through these bars or blocks and the center of the fifth at (*f*) constituting the turning point of the vehicle. Fig. 8 is the under view of the mode of applying my improvement to vehicles of this description.

Fifth. My improvement may be applied to omnibuses with elliptic springs in the same way as to carriages without a perch; but if half springs are used, as they may be to bring the body lower, a different mode of construction is required as shown in Figs. 9 and 10. Two futchils one shown at (*h*) extend from the draw bar (*j*) parallel to each other and at a distance apart equal to the diameter of the fifth wheel, as far back as the length of the spring requires, and are there fastened to an additional bar (*k*). Two more bars or blocks *g*, and *l* extend from one futchil to the other. The upper plate of the fifth wheel is fastened to the body, the under plate is fastened to the futchils and to the bars *g*, *l* and *k*. The king bolt passes through the block *g* and through the center of the fifth wheel at (*b*) and constitutes the turning point of the vehicles. Fig. 10 is the under view of the mode of applying my improvement to vehicles of this description.

An examination of the model herewith forwarded, which is so arranged as to exhibit both the old mode of construction and also my improvement will show the advantages of the latter over the old mode. It will be seen that in the operation of turning with vehicle constructed under my improvement, the space between the wheels and the body is widened, the pole is made to stand more at right angles with the carriage, the fore wheel on the turning side will describe a larger circle and the opposite fore wheel a smaller circle than in vehicles constructed on the old plan and the hind wheels will follow nearly in the track of the fore wheels, thus causing the carriage in turning to describe a much smaller circle than it would if constructed upon the old plan.

The modes of applying my improvement to the several kinds of carriages as above described, are those which after numerous experiments I have adapted as the most feasible and attended with the least expense. But every mechanic will see that there are many other modes in which it could be applied, and perhaps in some with equal advantage. I therefore do not intend to limit my claim to the modes of applying my improvement above described, but What I do claim and desire to secure by Letters Patent, is An improvement in constructing the running part of four wheeled vehicles by placing the turning points of such vehicles back of the forward axle tree.

Dated at New Haven December 19, 1850.

GUSTAVUS HAUSSKNECHT.

Witnesses:
 DENNIS KIMBERLY,
 M. S. BEACH.

[FIRST PRINTED 1913.]